F. V. DETWILER.
COOKING APPARATUS.
APPLICATION FILED NOV. 4, 1910.

1,089,911.

Patented Mar. 10, 1914.

3 SHEETS—SHEET 1.

Inventor:
Forest V. Detwiler
by Brown & Hopkins
Attys.

F. V. DETWILER.
COOKING APPARATUS.
APPLICATION FILED NOV. 4, 1910.
1,089,911.
Patented Mar. 10, 1914.
3 SHEETS—SHEET 2.
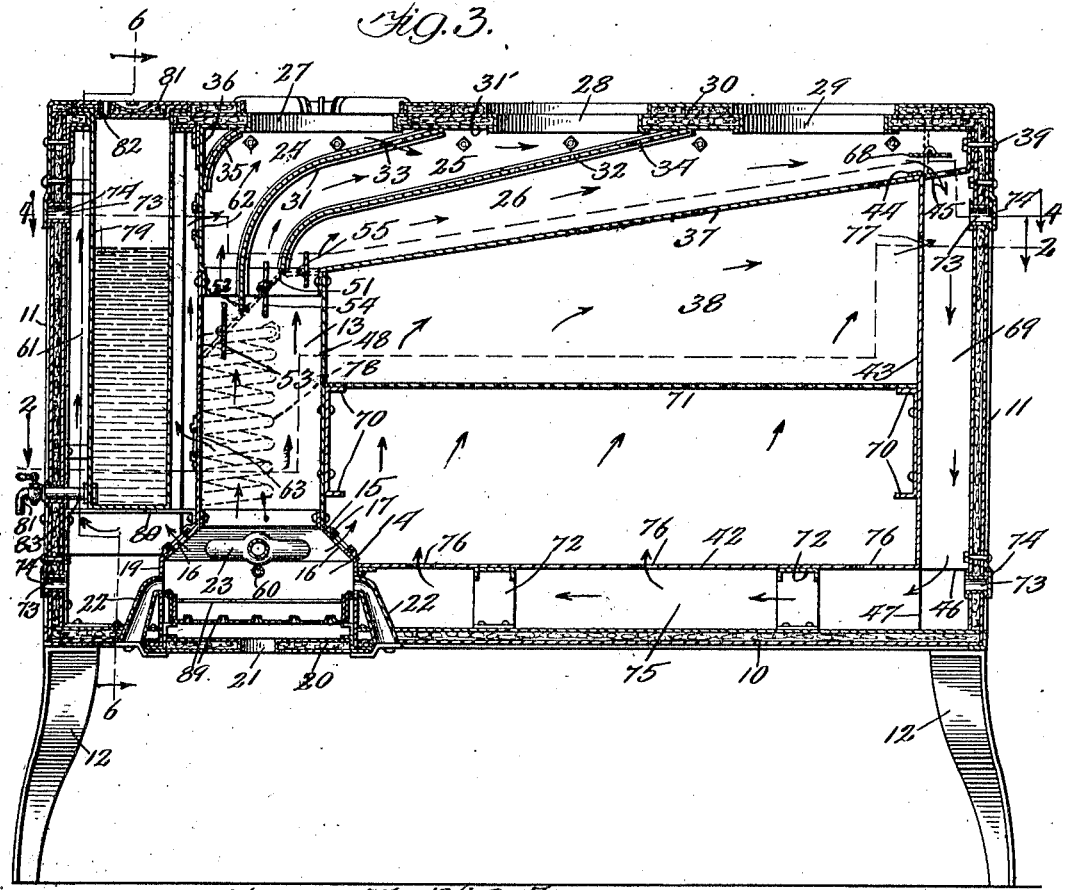
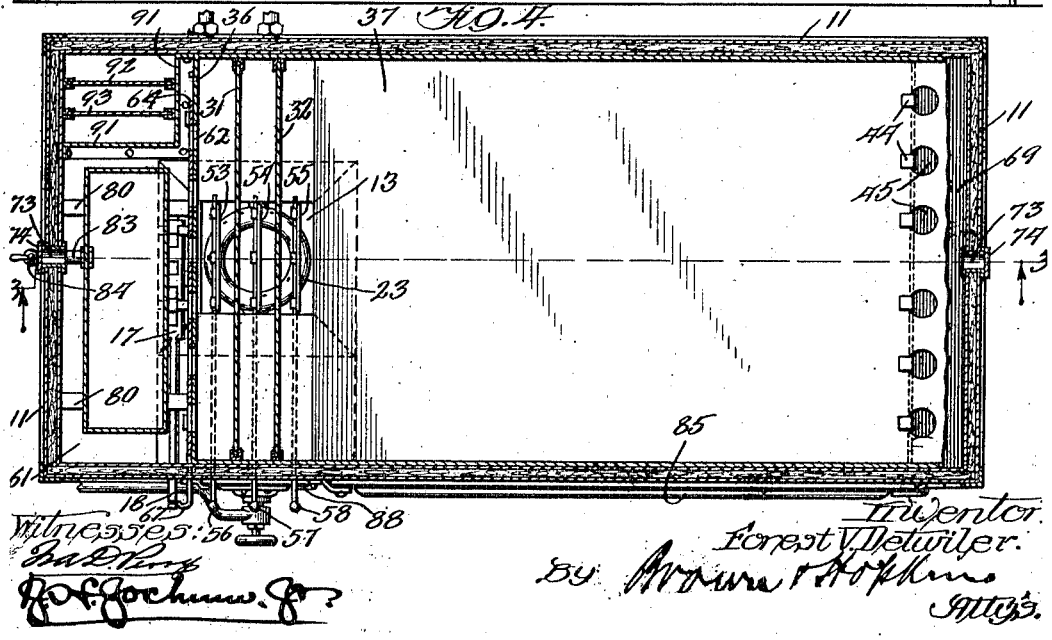

F. V. DETWILER.
COOKING APPARATUS.
APPLICATION FILED NOV. 4, 1910.

1,089,911.

Patented Mar. 10, 1914.
3 SHEETS—SHEET 3.

Witnesses:

Inventor:
Forest V. Detwiler
By Brown & Hopkins
Attys.

UNITED STATES PATENT OFFICE.

FOREST V. DETWILER, OF CHICAGO, ILLINOIS.

COOKING APPARATUS.

1,089,911.  Specification of Letters Patent.  Patented Mar. 10, 1914.

Application filed November 4, 1910. Serial No. 590,652.

*To all whom it may concern:*

Be it known that I, FOREST V. DETWILER, a citizen of the United States, residing at Chicago, in the county of Cook and State of Illinois, have invented certain new and useful Improvements in Cooking Apparatus, of which the following is a specification.

This invention relates to improvements in cooking apparatus particularly constructed for the employment of gaseous fuel in connection with a burner and one of the objects of the invention is to provide an improved apparatus of this character in which is employed an oven and a plurality of flues leading from the burner to the top stove holes, so that cooking may be done at one or more of the stove holes in the cooker and also in the oven.

A further object is to provide improved means for controlling the products of combustion or heated air whereby it may be discharged to the stove holes in the cooker and thence to the oven thereby causing the heated air to circulate across the stove holes and about the oven.

A further object is to provide an improved water heating attachment so arranged that the water therein will be heated without the flame coming into direct contact with the attachment.

A further object is to provide an improved water supply tank arranged in the path of circulation of the heat and in a position where the flame will not come into contact therewith.

Figure 1:
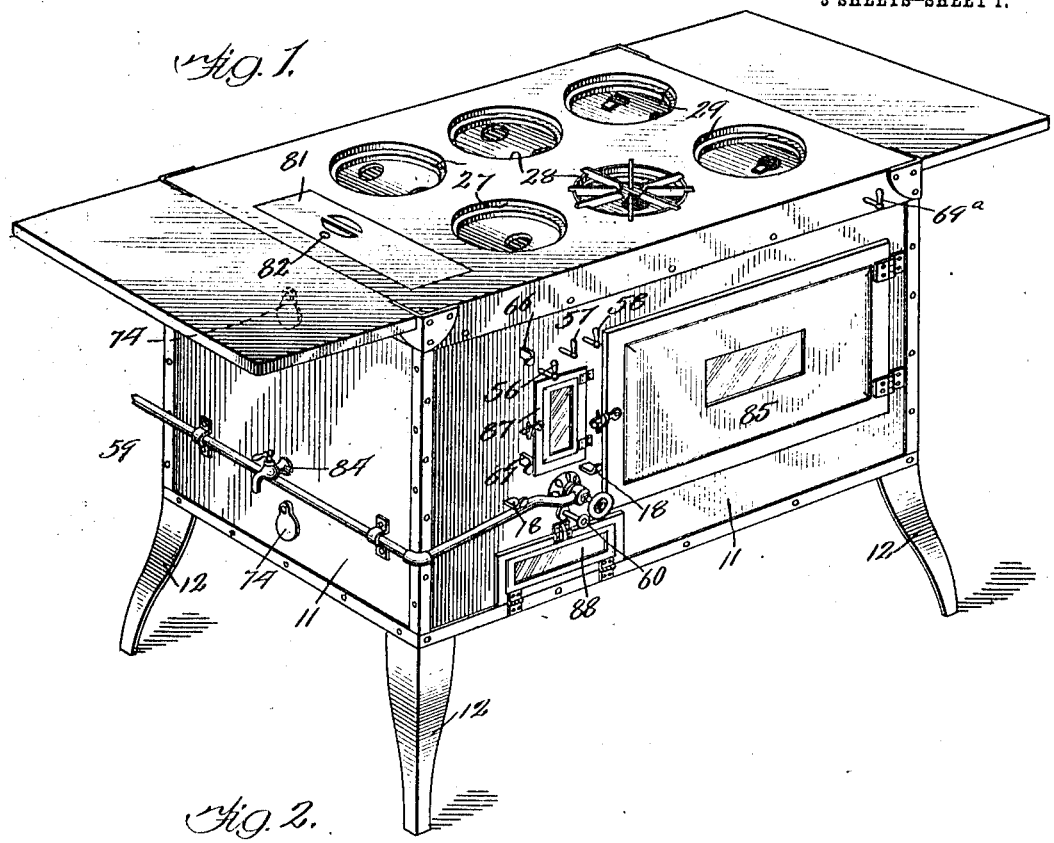
Figure 2:
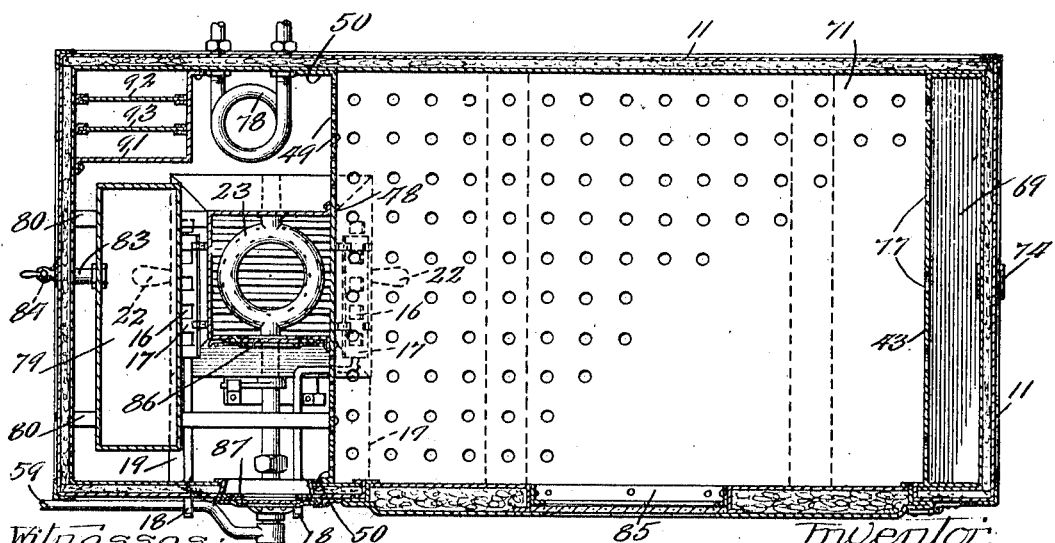
Figure 5:
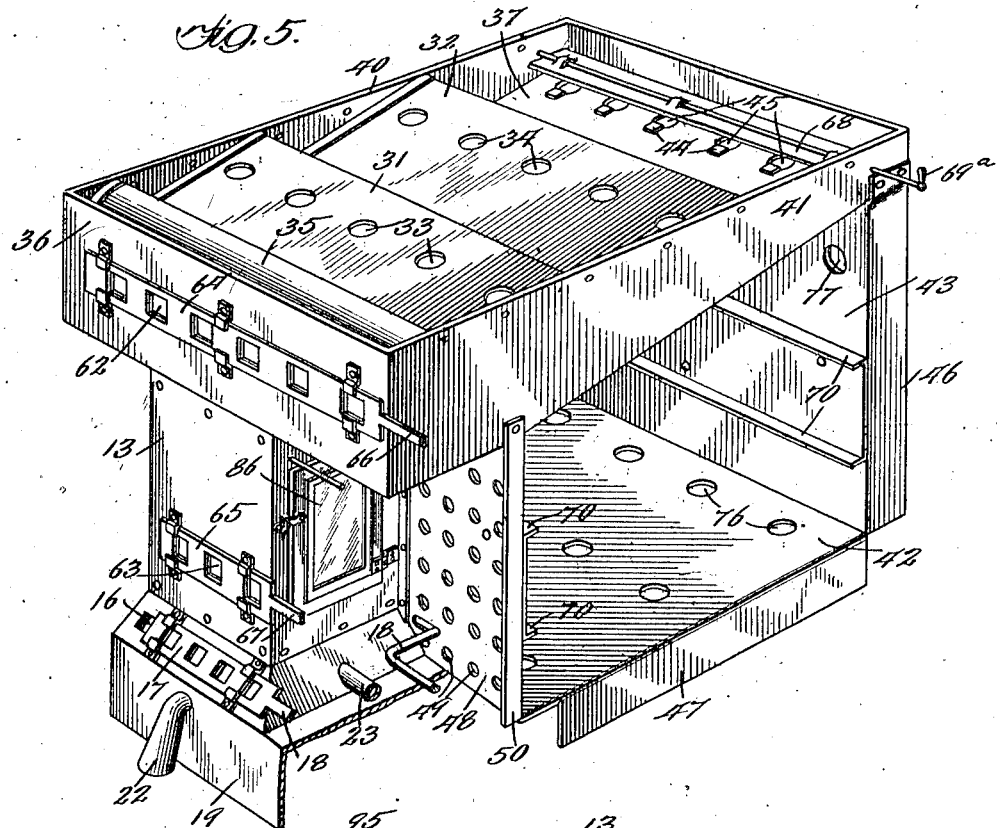
Figure 6:
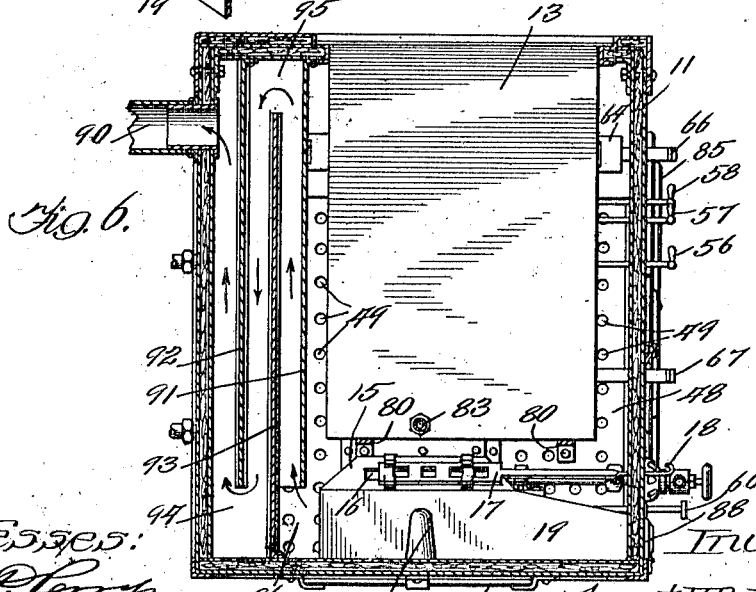

To the attainment of these ends and the accomplishment of other new and useful objects, as will appear, the invention consists in the features of novelty in the construction, combination and arrangement of the several parts hereinafter more fully described and claimed and shown in the accompanying drawings, in which:

Figure 1 is a perspective view of an improved device of this character constructed in accordance with the principles of this invention. Fig. 2 is a horizontal sectional view taken on line 2—2 of Fig. 3. Fig. 3 is a longitudinal sectional view on line 3—3 of Fig. 4. Fig. 4 is a horizontal sectional view on line 4—4 of Fig. 3. Fig. 5 is a detail perspective view of the cooker with the outer casing removed. Fig. 6 is a sectional view on line 6—6 of Fig. 3.

Referring more particularly to the drawings and in the present exemplification of the invention, the outer casing comprises a bottom 10 and surrounding upright walls 11, all of which may be constructed in any desired or suitable manner and of any suitable material but are preferably constructed of sheet material comprising spaced members between which is arranged suitable heat non-conducting material. The casing may be of any desired size and configuration but is preferably rectangular in shape and is mounted upon suitable supporting legs 12.

Arranged within the casing is a heated air tube or flue 13 which is of a size somewhat less than the width of the casing and is preferably arranged in proximity to one end of the casing. This tubular member is constructed of any suitable material and is of any desired configuration. The lower portion of the flue 13 is enlarged as at 14 to form inclined walls 15 having apertures or openings 16 adapted to be closed by dampers 17 and these dampers 17 are provided with operating handles 18 which extend through the front of the casing, as shown more clearly in Figs. 1 and 2. The lower extremity of the enlarged portion 14 of the flue is shaped to form upright walls 19 and the bottom 10 of the casing is provided with an aperture therethrough of a size substantially equal to the size of the portion 14, with which the latter registers. This flue forms a heated air passage and is secured in position in any suitable manner, preferably by means of the lower extremity thereof projecting into the aperture in the bottom 10 of the casing. A closure 20 is provided for the opening in the bottom 10 and is provided with an aperture 21 through which outside air may enter the flue. A plurality of air circulation tubes 22 are provided adjacent the bottom of the flue and these tubes 22 have communication with the outside air through the bottom 10 of the casing and also with the flue through the wall thereof, whereby sufficient air may be supplied to the burner 23 which is located in the enlarged portion 14 of the flue. The smaller portion of the flue 13 is of any desired height, but is preferably somewhat less than the height of the interior of the casing.

A plurality of branch flues 24, 25, 26, have communication at one end with the extremity of the flue 13 and each of the flues 24, 25, 26, thus formed, are so arranged as to discharge a portion of the heated air from the flue 13 respectively to the stove holes 27, 28, 29 in the top 30 of the casing, so that the hot air and gases will pass under the stove holes so that cooking may be done at one or more of the stove holes. The top 30 is preferably constructed in the same manner as the sides and bottom of the casing and a reinforce 31', similar in construction to the top 30 is provided for the top. The flue 25 is preferably formed by means of spaced deflectors 31, 32, which are constructed of any suitable material, but preferably of sheet material provided respectively with apertures or openings 33, 34, located in close proximity to the top 30 of the casing and also to the stove holes. The flue 24 is formed by the deflector 31 and a deflector 35 (see particularly Figs. 3 and 5) which latter is supported in any suitable manner, preferably by means of a wall or partition 36 extending from the top of the flue 13 to the top 30 of the casing. The flue 26 is formed by the partition 32 and the top wall of the oven which oven is designated generally by the reference numeral 38. The wall 37 is supported at one end, preferably by the flue 13 and inclines upwardly from its point of support to one of the side walls of the casing and is secured to said wall by means of suitable fastening devices 39. The sides of the branch flues 24, 25, 26, thus formed, are closed by means of walls 40, 41 (see Fig. 5), so that the products of combustion or heated air entering these flues will be directed toward the respective stove holes.

A single piece of sheet material is bent to form the bottom of the oven 38 (see Figs. 3 and 5) and an upright wall 43, which latter is secured in position by means of suitable fastening devices 44 fastened through apertures or openings 45 in the top 37 of the oven and which apertures or openings 45 are spaced some distance from the adjacent wall of the casing. In order to hold the wall 43 and the bottom 42 of the oven spaced from the adjacent walls of the casing, flanges 46 are provided on the wall 43 and similar flanges 47 are provided on the bottom 42 and are adapted to engage the adjacent walls to form heated air circulation passages. The wall of the oven opposite the wall 43 is formed by an upright wall 48, which latter forms one of the walls of the flue 13. The portions of the wall 48 extending beyond the flue 13 are provided with a plurality of apertures or openings 49, as shown more clearly in Figs. 2 and 5, for a purpose to be set forth. This wall 48 extends to the walls of the casing and is provided with flanges 50 which terminate adjacent the bottom 42 of the oven.

The deflector 31 arranged between the branch flues 24, 25 projects below the extremity 51 of the deflector 32, as at 52, so that the inlet openings to the flue 24 will be located below the inlet openings of the flue 25, and the inlet opening of the flue 25 is located below the inlet opening of the flues 26, so that the heated air discharged from the flue 13 will be divided and will be equally distributed into the branch flues 24, 25, 26.

In order that the flues 24, 25, 26 may be controlled, dampers 53, 54, 55 are respectively provided for these flues and handles 56, 57, 58 are provided for the respective dampers and which handles project through the front of the casing whereby the dampers may be manipulated from the outside of the casing. These dampers are so arranged with respect to each other and to the inlet openings of the flues, that when the dampers 53, 54 are adjusted to close the entrance openings of the flues 24, 25, they will form an inclined deflector as shown in dotted lines in Fig. 3 for directing all of the heated air into the flue 26 when the damper 55 is open.

The burner 23 receives its supply of fuel through a suitable supply pipe 59. which latter is connected with any suitable source of supply, and a pilot burner 60 is provided for lighting the burner.

The wall 36 and the adjacent wall of the tubular member 13 are spaced for some distance from the adjacent wall 11 of the casing to form a space 61, for a purpose to be hereinafter set forth; and are provided with openings 62, 63 for a purpose which will also be set forth, and these openings are respectively controlled by dampers 64, 65, handles 66, 67 of which project through the front of the casing, as shown more clearly in Fig. 1.

The damper 68 (see Fig. 3) is provided adjacent the outlet of the flue 26 and this damper serves as a means for preventing the heated air from entering the passage 69 formed between the wall 43 of the oven 38 and the adjacent wall of the casing, and this damper 68 is controlled by means of a handle 69ª located on the outside of the casing.

Suitable shelf supports 70 for the shelf 71 are provided in the oven 38 and supporting members 72 may be provided for supporting the bottom 42 of the oven.

Air inlet openings 73 are provided in the walls 11 of the casing for admitting outside air into the casing and for ventilating the oven, and dampers or closures 74 are provided for these openings.

With this improved construction it will be apparent that the products of combustion from a single burner will be discharged to one or more of the stove holes 27, 28, 29 to circulate thereacross, by means of the heated air flues 24, 25, 26 so that cooking may be done on one or more of the stove holes. These branch flues communicate with the tube or flue 13 into which the products of combustion are discharged, flues 24, 25, 26 being formed by the curved deflectors 31, 32, 35. It will also be apparent that the heated air will be discharged under the stove holes in the cooker and thence to the oven 38 so that the hot air or gases will be compelled to circulate by passing through openings 33, 34 in the deflectors 31, 32 and the openings 45 in the top 37 of the oven into the heated air circulation passage 69 behind the wall 43 of the oven when the damper 68 is opened. From this heated air passage 69 the heated air or gases will be discharged into the passage or flue 75 formed below the bottom 42 of the oven and through the openings 76 in the bottom into the oven where it will circulate and will pass out of the oven through the openings 77 in the wall 43, and will continue to thus circulate until the damper 68 is closed, at which time the air will pass out of the openings 27, 28, 29. At the same time heated air from the burner 23 will enter the oven 38 through the openings 16 in the heated air flue when the damper 17 is opened. The oven may be ventilated by adjusting the dampers 74 to permit outside air to enter the heated air passage 69. Thus, it will be seen that the openings 33, 34 in the curved deflectors 31, 32 permit the heated air to circulate from one of the flues to another, and when it is desired to use only the stove holes, the damper 68 is closed and the heated air is charged directly to the stove holes. If it is desired to cause the heated air to circulate under the stove holes, the damper 68 may be opened and the damper 64 controlling the upper openings 63 in the wall 36 is also opened. This, as will be apparent, will cause the circulation of the heated air about the oven as well as across or under the stove holes.

It will also be apparent that cooking may be carried on at the stove holes 27, 28, 29 in the casing at the same time that articles are cooking in the oven. When it is desired, any one or more of the flues 24, 25, 26 may be closed to prevent the heated air from entering therein without affecting the cooking in the oven 38, inasmuch as the heated air will circulate through the openings 33, 34.

A water heater designated generally by the reference numeral 78 may be placed within the casing, preferably adjacent the upper portion of the flue 13, and this water heater may be connected at its extremities, which latter pass through the wall of the casing, to any suitable source of supply and to any discharge pipe. With this construction it will be apparent that the water in the coil or heater 78 will be heated by the heated air in the casing and without the flame coming into contact with the heater, thereby prolonging the life of the heater.

A water tank 79 is arranged within the space 61 and is supported in any desired or suitable manner, preferably by means of brackets or supports 80. This water tank may be of any suitable size and configuration and preferably extends through the top 30 of the casing. A closure 81, having a vent opening 82, is provided for the tank and a discharge pipe 83 extends through the wall of the casing and is provided with a stop cock 84, by means of which the water in the tank may be drawn off when desired. The heated air circulates against the tank from the flue by passing through the openings 16 in the adjacent wall 15 of the heated air flue and the openings 63 of the adjacent wall of the flue 13 when the respective dampers 17, 65 are open. The heated air thus entering the space 61 will be discharged therefrom through the openings 62 in the wall 36 and into the flue 24, when the damper 64 is open, thus the circulation and distribution of the heated air can be positively controlled, and when it is desired the dampers 17, 65, 64 may be closed, which will shut off the circulation of the heated air in the space 61. Any one or more of the dampers 53, 54, 55 may be closed to prevent the heated air from entering the respective flues 24, 25, 26 and the damper 68 may be opened or closed to permit or prevent the circulation of the heated air or gases around the oven.

The openings 49 in the wall 48 of the oven will also permit the heated air or gases to enter the space 61 in which the tank 79 is located.

The front of the casing is provided with a door opening having a closure 85 by means of which access may be had to the oven and the flue, and the flue 13 is provided with an opening in the wall thereof which is closed by a closure 86 by means of which access may be had to the interior of the flue. The front wall of the casing is provided with an opening in proximity to the closure 86 and is provided with a closure 87. A closure 88 is provided for another opening in the front wall of the casing and is arranged adjacent the enlarged portion 14 of the main heated air flue and through which opening access may be had to a grate or broiler 89 arranged in the enlarged portion 14.

This improved construction is also adapted for use in burning natural gas, but in order to adapt it for use with such fuel, it is necessary to prevent the disagreeable odors which result from the use of natural gas being discharged into the room, as well as to carry off the odors from the cooking food. In order to accomplish this result, these odors are caused to circulate through a portion of the casing to a discharge outlet, the circulation being provided for the purpose of conserving or preventing the escape of the heat units with the odors. For this purpose there is provided a discharge outlet 90 (see Fig. 6) which leads to any suitable point of discharge, such as a chimney or flue and a casing is formed adjacent this outlet 90 and comprises inclosing walls 91 and a series of partitions 92, 93, which latter are arranged within the casing formed by the walls 91. The partitions 92, 93 are staggered with relation to each other, that is to say, one of the partitions 92 extends from the top of the cooker casing and terminates short of the bottom thereof to form a passage 94, while the partition 93 extends from the bottom of the cooker casing and terminates short of the top thereof to form a passage 95, while the walls 91 also extend from the top of the cooker casing and terminate short of the bottom of the latter to form an inlet passage 96. This inlet passage 96 has communication with the interior of the cooker casing, preferably with the space 61, and the partitions 92, 93 and the walls 91 are spaced from each other to form a tortuous passage for the gases, the outlet 90 being located adjacent the end of the passage formed by the partition 92 and the adjacent wall of the cooker, remote from the inlet 94 thereof.

In this improved construction it, will be manifest that the products of combustion or heated air of the burner 23 will be discharged into the tube or flue 13 from which it will enter the branch flues 24, 25, 26 and be discharged directly to the stove holes when the damper 68 is closed. In order to permit circulation of the heated air across the stove holes, the partitions forming the walls of the flues are provided with the openings 33, 34 which latter are located in close proximity to the stove holes and form communication between the respective flues at points remote from the inlet ends of the flues. When the damper 68 is open and when the damper 74 controlling the upper opening 73 through the wall of the casing is open, direct communication from the interior of the casing to the external air will be formed. This will cause or induce a circulation of the heated air across the stove holes, inasmuch as the draft caused by this opening will draw the heated air through the openings 33, 34 in the partitions, past the damper 68, through the openings 45 and thence out of the upper opening 73.

When it is desired to employ the oven for baking purposes and in order to induce a circulation of the heated air across the stove holes and also about the oven, the dampers 74 controlling the lower openings 73 in the walls of the casing, or the openings adjacent the base thereof, may be opened, which will cause the heated air to also circulate through the heat passage 69.

What is claimed as new is:

1. A cooking apparatus comprising an inclosing casing having stove holes in the top thereof, a flue within the casing adjacent one side thereof and having a plurality of branches leading to the stove holes, a source of supply of heat discharging into the flue, an oven in the casing, one wall of the oven being adjacent the flue, a second flue extending about the oven and having communication with the first said flue, and means for causing the heated air from the first said flue to pass under the stove holes and circulate about the oven, said branches having points of connection with the flue in different horizontal planes with relation to each other.

2. A cooking apparatus comprising an inclosing casing having stove holes in the top thereof, a flue within the casing and having a plurality of branches leading to the stove holes, a source of supply of heat for the flue, an oven in the casing, a flue extending about the oven and having communication with the first said flue, and dampers individual to the said branches for controlling the heated air therein, said dampers being disposed in different horizontal planes and adapted when adjusted to close the respective branches to form deflectors inclined to the horizontal for diverting the heated air into an open branch.

3. A cooking apparatus comprising an inclosing casing having stove holes in the top thereof, a flue within the casing, a source of supply of heat for the flue, curved deflectors extending into the top of the flue to form portions of branch flues extending from the first said flue to the stove holes, some of said deflectors extending into the flue a greater distance than others, said deflectors being provided with openings therethrough adjacent the top of the casing, an oven, a flue extending about the oven and communicating with the first said flue, and means for causing the heated air from the branch flues to pass under the stove holes and circulate about the oven.

4. A cooking apparatus comprising an inclosing casing having stove holes at the top thereof, a flue within the casing, a source of supply of heat for the flue, curved deflectors extending into the top of the flue to form portions of branch flues extending from the first said flue to the stove holes, some of said deflectors extending into the flue a greater distance than others, said deflectors being provided with openings therethrough adjacent the top of the casing, an oven, a flue extending about the oven and communicating with the first said flue, and means for admitting outside air into the casing to induce circulation of the heated air about the oven.

5. A cooking apparatus comprising an inclosing casing having stove holes in the top thereof, a flue within the casing, a source of supply of heat for the flue, curved deflectors extending from the top of the casing to the top of the flue to form portions of branch flues for communication with the first recited flue and extending to the respective stove holes, said branch flues communicating with the first recited flue at different points with respect to the height of the latter, an oven in the casing, a flue about the oven and communicating with the first said flue, and means for controlling the heated air to cause the latter to flow across the stove holes and to circulate about the oven.

6. In a cooking apparatus, the combination of an inclosing casing having stove holes in the top thereof, an oven in the casing having a heated air circulation passage therearound, a flue in the casing, branch flues extending directly from the said flue to the respective stove holes and a burner discharging into the first recited flue, each of said branches also having communication with each other, there being means for causing the heated air to flow under the stove holes and through the heat passage about the oven.

7. In a cooking apparatus, the combination of an inclosing casing having stove holes in the top thereof, an oven in the casing having a heated air circulation passage therearound, a heat flue in the casing, branch flues extending directly from the first said flue to the respective stove holes, a burner discharging into the first recited flue, some of the said branches also having communication with the others, there being means for causing the heated air to flow under the stove holes and through the heat passage about the oven, and means individual to said branches for closing one or more of the branches to the entrance of heated air directly from the first recited flue.

8. In a cooking apparatus, the combination of an inclosing casing having stove holes in the top, an oven in the casing having a heated air circulation passage therearound, a flue in the casing having branches leading to the respective stove holes, there being means inducing a circulation of the heated air in the branches across the stove holes and about the oven, means whereby one or more of the said branches may be closed to the entrance of heated air directly from the flue, a source of supply of heat for the flue, and means whereby heated air may be discharged from the said flue directly into the casing independently of the branches.

9. In a cooking apparatus, the combination of an inclosing casing having stove holes in its top, an oven in the casing having a heated air circulation passage therearound, a flue in the casing having branches leading directly to the respective stove holes, a source of supply of heat for the flue, there being means inducing a circulation of the heated air in the branches across the stove holes and about the oven, means whereby one or more of said branches may be closed to the entrance of heat directly from the flue, said flue having means whereby heated air may be discharged from the flue directly into the casing independently of the branches, and means for controlling the last said means at will.

10. In a cooking apparatus, the combination of an inclosing casing having stove holes in its top, an oven in the casing having a heated air passage therearound, a flue in the casing having branches leading directly to the respective stove holes, there being means inducing a circulation of the heated air in the branches across the stove holes and about the oven, means whereby one or more of the said branches may be closed to the entrance of heat directly from the flue, said flue having means whereby heated air may be discharged from the flue directly into the casing independently of the branches, means for controlling the last said means at will, and a burner for supplying heated air to the flue.

11. In a cooking apparatus, the combination of an inclosing casing having stove holes in its top, an oven in the casing having a heated air passage therearound, a flue in the casing having branches leading directly to the respective stove holes, there being means inducing a circulation of the heated air in the branches across the stove holes and about the oven, means whereby one or more of the said branches may be closed to the entrance of heated air directly from the flue, said flue having means whereby heated air may be discharged from the flue directly into the casing independently of the branches, means for controlling the last said means at will, a burner inclosed within the casing for supplying heated air to the flue and means for admitting external air to the burner.

12. In a cooking apparatus, the combination of an inclosing casing having stove holes in its top, an oven in the casing having a heated air passage therearound, and a flue in the casing having branches leading directly to the respective stove holes, there being means inducing a circulation of the heated air in the branches across the stove holes and about the oven, a source of supply of heat for the flue, means whereby said branches may be closed to the flue, said flue having means whereby heated air may be discharged from the flue directly into the casing, there being means whereby the heated air from the casing may enter the said branches.

13. In a cooking apparatus, the combination of an inclosing casing having stove holes in its top, an oven in the casing having a heated air passage therearound, a flue in the casing having branches leading directly to the stove holes, there being means inducing a circulation of the heated air in the branches across the stove holes and about the oven, means whereby said branches may be closed to the flue, said flue having means whereby heated air may be discharged from the flue directly into the casing, there being means whereby the heated air from the casing may enter the said branches, means individual to the last two recited means for controlling the latter and a source of supply of heat for the flue.

14. In a cooking apparatus, the combination of an inclosing casing having stove holes in its top, an oven in the casing having a heated air passage therearound, a flue in the casing having branches leading directly to the respective stove holes, there being means for admitting external air into the casing for inducing a circulation of the heated air in the branches across the stove holes and about the oven, means whereby said branches may be closed to the flue, said flue having means whereby heated air may be discharged from the flue directly into the casing, there being means whereby the heated air from the casing may enter the said branches, means individual to the last two recited means for controlling the latter and a source of supply of heat for the flue.

15. In a cooking apparatus, the combination of an inclosing casing, having a stove hole in its top, an oven in the casing having a heated air passage therearound, a flue in the casing leading directly to the stove hole, a source of supply of heat for the flue, there being means inducing the circulation of the heated air from the flue across the stove hole and about the oven, means for controlling such circulation, and a water heater in the casing outside of and independent of the flue, said flue having means whereby the heated air may be discharged directly from the flue into the casing and before reaching the stove hole, to circulate against the water heater.

16. In a cooking apparatus, the combination of an inclosing casing having a stove hole in its top, an oven in the casing having a heated air passage therearound, a flue in the casing leading to the stove hole, a source of supply of heat for the flue, means inducing a circulation of the heated air across the stove hole and about the oven, means for controlling such circulation, a water heater in the casing outside of and independent of said flue, said flue having means whereby the heat may be discharged directly from the flue into the casing and before reaching the stove hole to circulate against the water heater, and means for controlling the last recited means at will.

17. A cooking apparatus, embodying an inclosing casing having stove holes in the top thereof, a flue within the casing adjacent one side thereof and having a plurality of branches leading to the stove holes, said branches having points of communication with the flue in different horizontal planes with relation to each other, means individual to the branches for controlling the inlet ends thereof, and a source of supply of heat for the flue.

18. A cooking apparatus, embodying an inclosing casing, having stove holes in the top thereof and a heat flue within the casing adjacent the side thereof and having a plurality of branches leading to the stove holes, said branches having points of communication with the flue in different horizontal planes with relation to each other, there being one or more openings through the wall of the branches adjacent the stove holes and forming communication between the branches, there being also one or more openings other than the stove holes in the wall of the casing and having communication with the outside air and disposed adjacent the opening in the wall of the flue for inducing a circulation of the heated air through the walls of the flues and across the stove holes, and a source of supply of heat for the flues.

19. A cooking apparatus, embodying an inclosing casing having stove holes in the top thereof, a flue within the casing adjacent one side thereof and having a plurality of branches leading to the stove holes, said branches having points of communication with the flue in different horizontal planes with relation to each other, there being one or more openings through the walls of the branches adjacent the stove holes and forming communication between the branches, there being also one or more openings other than the stove holes in the wall of the casing and having communication with the outside air and disposed adjacent the opening in the wall of one of the flues for inducing circulation of the heated air through the walls of the flues and across the stove holes, means for controlling the last recited openings, and a source of supply of heat for the flue.

20. In a cooking apparatus, the combination of a casing having a stove hole in its top, an oven in the casing having a heated air passage therearound, a flue in the oven leading to the stove hole, a burner for supplying heated air to the flue, there being means for causing the heated air in the flue to circulate under the stove hole and about the oven, a discharge outlet leading from the casing, a casing having communication with the first said casing and the said outlet and into which the heated gases flow, and partitions within the last recited casing and arranged in staggered relation to each other to form a tortuous passage for the products to the said outlet.

21. In a cooking apparatus, the combination of an inclosing casing having stove holes in the top thereof, a flue in the casing, a plurality of branches individual to the stove holes and leading from the flue, the walls of said branches being provided with passages forming communication between the branches adjacent the stove holes, a heater discharging into the flue, there being a heat passage having communication with one of the branches for inducing a circulation of heated air across the stove holes, and means for controlling the last said passage.

22. In a cooking apparatus, the combination of an inclosing casing having stove holes in the top thereof, a flue in the casing, a plurality of branches individual to the stove holes and leading from the flue, the walls of said branches being provided with passages forming communication between the branches adjacent the stove holes, dampers individual to the branches for controlling the admission of heated air into the branches, a heater discharging into the flue, there being a heat passage having communication with one of the branches for inducing a circulation of heated air across the stove holes, and means for controlling the last said passage.

23. In a cooking apparatus, the combination of an inclosing casing having stove holes in the top thereof, a flue in the casing, a plurality of branches individual to the stove holes and leading from the flue, the walls of said branches being provided with passages forming communication between the branches adjacent the stove holes, a heater discharging into the flue, there being a heat passage having communication with one of the branches for inducing a circulation of heated air across the stove holes, and means for controlling the last said passage, said branches having communication with the flue in different horizontal planes.

24. In a cooking apparatus, the combination of an inclosing casing having stove holes in the top thereof, a flue in the casing, a plurality of branches individual to the stove holes and leading from the flue, the walls of said branches being provided with passages forming communication between the branches adjacent the stove holes, dampers individual to the branches for controlling the admission of heated air into the branches, a heater discharging into the flue, there being a heat passage having communication with one of the branches for inducing a circulation of heated air across the stove holes, and means for controlling the last said passage, said branches having communication with the flue in different horizontal planes.

In testimony whereof I have signed my name to this specification in the presence of two subscribing witnesses, on this 31st day of October, A. D. 1910.

FOREST V. DETWILER.

Witnesses:
J. H. JOCHUM, Jr.,
M. P. CANTWELL.